July 6, 1948.  R. BASSINGER ET AL  2,444,588
DRYING METHOD
Original Filed Feb. 19, 1944  2 Sheets-Sheet 1
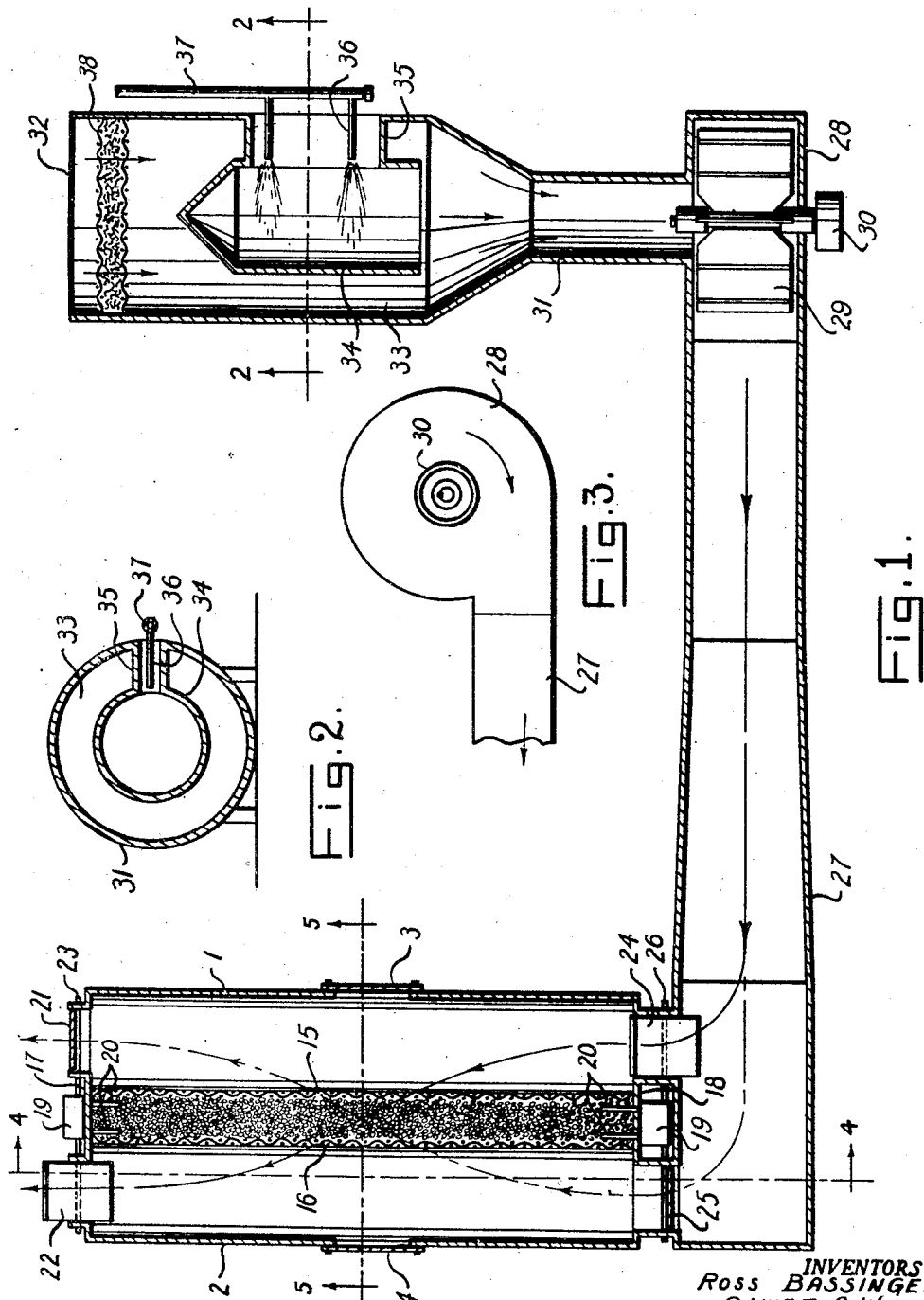
INVENTORS
ROSS BASSINGER
OLIVER A. WRIGHT
BY
ATTORNEYS July 6, 1948.   R. BASSINGER ET AL   2,444,588
DRYING METHOD
Original Filed Feb. 19, 1944   2 Sheets-Sheet 2

ROSS BASSINGER
OLIVER A. WRIGHT
INVENTOR.

BY
ATTORNEYS

Patented July 6, 1948

2,444,588

UNITED STATES PATENT OFFICE 2,444,588

DRYING METHOD

Ross Bassinger and Oliver Amos Wright, Houston, Tex.; said Bassinger assignor to said Wright Original application February 19, 1944, Serial No. 523,034. Divided and this application February 13, 1948, Serial No. 8,068

5 Claims. (Cl. 34—31)

1

This invention relates to drying methods and has for its general object the provision of such a method which will accomplish the drying of various substances such as for example grain or the like in a very economical manner and without injuring the product being dried.

The method of this invention will be described in connection with the drying of rice after harvesting, but it will be understood by persons skilled in the art that the method of this invention may be readily applied to the drying of other materials such as other grains, root and leaf plants, and various manufactured products and the like.

In the connection with the drying of rice it is well known that rice harvesting involves a drying problem which is somewhat more difficult than that encountered in connection with many other grains and products. Being a water plant, rice cannot be allowed to stand until fully ripe because when it ripens the stem weakens and the grain falls over. It has therefore been customary in the past to cut the rice and shock it and then to let it stand in the field until it dries so that its moisture content is low enough to permit it to be milled. It is then threshed, sacked and sent to the mill or it may, of course, be stored, but it can neither be milled nor stored before being properly dried because its moisture content will not permit its milling and this same moisture content will cause it to heat when stored.

Obviously the process of drying just referred to is dependent upon the whims of the weather and when the fall weather is very rainy as it not infrequently is in localities where rice is grown, a very long time may be required for the rice to dry sufficiently and much of it may be lost because it does not dry.

Another method which has been practiced to some extent in more recent years is to combine the rice and then spread it out on a floor under shelter for drying. This has the disadvantage of requiring very extensive floor space under cover and of requiring constant attention and turning in order to prevent the rice from heating.

The rice when cut usually has a moisture content of some 22% to 23% and it is necessary that this be reduced to 14% or 15% in order that the rice may be properly milled. Attempts have been made to combine the rice and then dry it artificially by blowing air through it, but the success of this method has been limited to those localities such as Southern California where the relative humidity of the air is in the neighborhood of 25% and where its temperature is around 100° to 110° Fahrenheit. The practice there has been to allow

2 the rice to move downwardly through a column having screen retainers for the rice on two opposite sides of the column, and to blow the air through this column for the purpose of removing the moisture. This method, however, is not adaptable to many areas such as the Gulf Coast area along the Gulf of Mexico where the relative humidity in many instances is as high as 80% with temperatures that are in the neighborhood of 75° to 85° Fahrenheit.

An attempt has been made to dry the rice by blowing air through it in those localities of high relative humidity such as just referred to, using air which has been heated to a temperature of 110° to 112° F. It has been supposed impossible to use higher temperatures for the drying air because it is fairly well known that if rice is heated above 110° F. it begins to deteriorate in quality in that it will check and crack. By such method as last referred to it has been found impossible to reduce the moisture content of the rice by more than 3% or 4% at one pass through the apparatus without damaging the rice. The practice has been in such case to put the rice through the apparatus once then send it to the bins where it is allowed to "rest" for a period of twenty-four hours, then put it through a second time, allow for another period of "rest," etc., until the desired moisture content has been obtained. This is, of course, very time consuming and requires a much larger installation for handling a given quantity of rice as well as a vast amount of labor for handling and rehandling the rice which would not be necessary if the rice could be handled in one pass through the drier. Also, unless the operation is watched very closely there is danger that the rice may be damaged by overheating or by some other accidental variation from the intended process.

In view of the foregoing it is an object of this invention to provide a method whereby rice and other products may be rapidly and efficiently dried without danger of damage to the product.

Another object of this invention is to provide such a method which will be relatively inexpensive to operate.

Another object of this invention is to provide such a method in which the danger of variation from the intended method and of consequent injury to the product being dried will be minimized.

Another object of this invention is to provide such a method in which the product may be dried to the extent desired without the necessity for more than one pass through the drying apparatus.

Another object of this invention is to provide a method in which the advantage of hot air or the like for drying purposes may be utilized without danger of overheating the product being dried.

Other objects and advantages of this invention will become apparent from the following description taken in connection with the accompanying drawings wherein is illustrated by way of example one embodiment of the invention.

In the drawings:

Fig. 1 is a view partly in horizontal cross section and partly in top plan illustrating an apparatus constructed in accordance with and for the purpose of carrying out the method of this invention.

Fig. 2 is a transverse cross section taken along the line 2—2 of Fig. 1.

Fig. 3 is a fragmentary view in side elevation illustrating the blower forming a portion of the apparatus of this invention.

Figure 4:
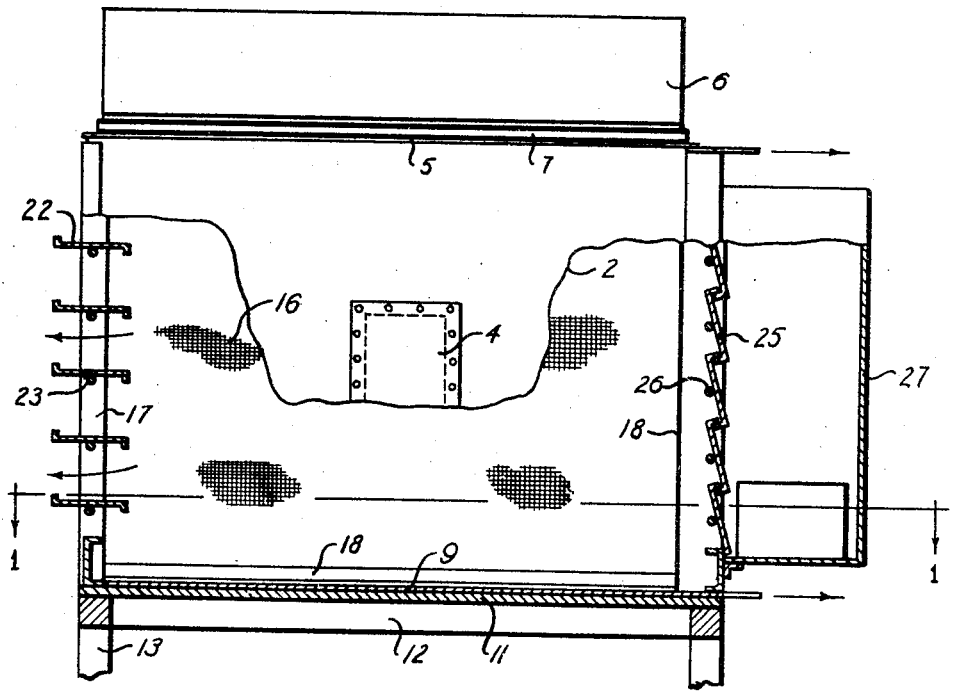
Fig. 4 is a view partly in vertical cross section taken along the line 4—4 of Fig. 1 and partly in side elevation.
Figures 5, 6:
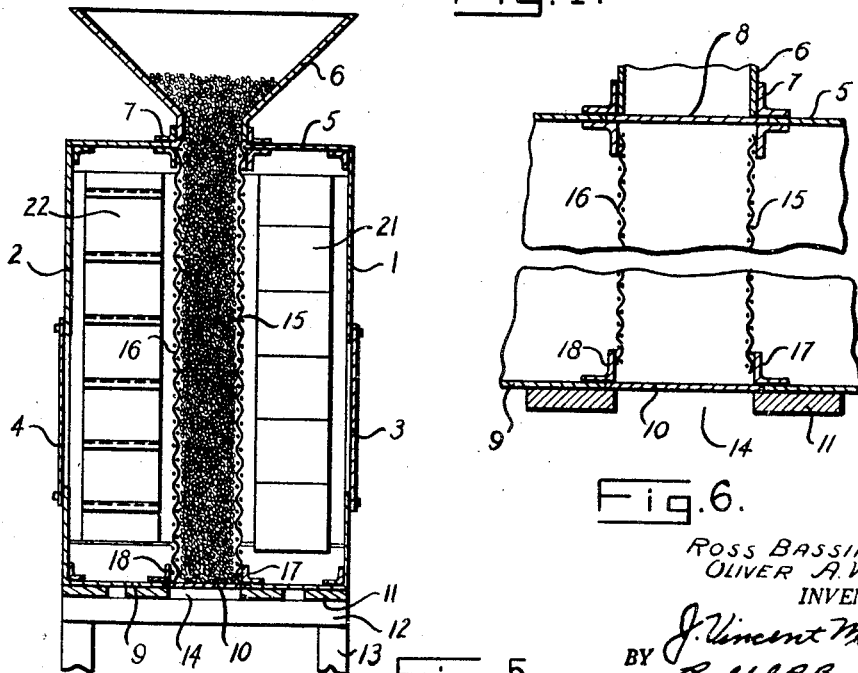
Fig. 5 shows a vertical cross section taken along the line 5—5 of Fig. 1.
Fig. 6 is a fragmentary cross sectional view similar to Fig. 5 and showing certain details of construction on an enlarged scale.

Referring now more in detail to the drawings, the grain or other product to be dried is contained within a housing having opposite side walls 1 and 2 which are imperforate except for manholes closed by manhole covers 3 and 4, these being provided for the purpose of access to the interior of the device in connection with making repairs, adjustments, etc.

The upper wall of the housing just referred to is illustrated at 5, and mounted upon this wall is a hopper 6 anchored to the wall by suitable means such as the angle irons 7, and arranged so that its outlet opening registers with an opening in the upper wall 5 of the housing. A slide 8 is provided for the purpose of closing the opening in the wall 5 of the housing, when the closure of such opening is desired.

The lower wall 9 of the housing is likewise provided with an opening of the same size as and directly below the opening in the upper wall 5 of the housing, and this opening in the lower wall 9 is adapted to be closed when desired by means of a slide closure member 10.

The housing as a whole is adapted to rest upon any suitable support such as the platform 11 carried on the cross beams 12 and the upright supports 13. The platform 11 is provided with an opening 14 therein registering with the opening in the lower wall 9 of the housing so as to permit material to pass from the housing through the opening in lower wall 9 thereof and through the opening 14 in the platform 11 without obstruction.

Extending between the openings in the upper wall 5 in the lower wall 9 of the housing, and extending throughout the entire width of the housing so as to divide the housing into three separate compartments, are a pair of perforate screen-like members or sheets 15 and 16. These are illustrated as being in the form of wire screens but it will be understood that any perforate retaining wall type of structure may be employed so long as the openings therethrough are of a size small enough to retain the product to be dried and large enough to permit the freest possible passage of air or other drying medium. These two retaining members 15 and 16 are anchored to the upper and lower walls 5 and 9 respectively by means of angle irons 17 and 18 or other suitable anchoring means.

It will be understood that the product to be dried is emptied into the hopper 6, and with the slide 10 in place so as to close the lower opening from the housing, the slide 8 is removed thus, permitting the grain or other product to pass downwardly and to fill the compartment provided between the two perforate walls 15 and 16. These walls are preferably substantially parallel so as to provide a body of the product to be dried which body is of uniform thickness throughout. It is preferred that sufficient of the product to be dried be provided so that it will partly fill the hopper 6 after the compartment between the walls 15 and 16 has been entirely filled, so that if the material should shrink upon drying, there will never be left a space at the upper end of the body of such product through which the drying medium might pass without doing any good.

As above mentioned, it is in many instances important in order to prevent injury to the product being dried to prevent it from reaching a temperature in excess of a predetermined maximum. For the purpose of governing this, suitable temperature indicating means 19 are preferably provided at each end of the drying compartment formed between the retaining walls 15 and 16, and such temperature indicating means may have thermometers or other temperature detecting portions 20 projecting into the body of grain adjacent each of the two perforate walls 15 and 16. In this way the temperature indicating means or the temperature controlled means 19 will be affected by the temperature of the body of grain adjacent each of the two opposite sides thereof, which may be utilized to automatically control the dehydrating operation in a manner to be hereinafter more fully described.

The other two compartments on each side of the grain receiving compartment are provided at their opposite edges with a series of shutters for controlling the flow of drying medium through the grain. Thus, at one end, one of the compartments is provided with a series of shutters 21 and the other with shutters 22. Both of these shutters may be controlled from a single shaft 23, and they should be so correlated that when one set of shutters 21 is closed the other set 22 will be open. Likewise, at the other end of each of these compartments there are additional sets of shutters 24 and 25, both of which may be controlled from the same shaft 26 so that when one set of shutters 24 is open the other set of shutters 25 will be closed. Shaft 26 also passes through a controller 19 for actuation thereby. It is still further desirable that the sets of shutters on the opposite ends of the compartments be correlated with respect to each other so that when the shutter 24 at one end of one of the compartments is open, the set of shutters 21 at the opposite end of the same compartment will be closed and vice versa. Likewise, when the set of shutters 25 at one end of the other compartment is closed, the set of shutters 22 at the opposite end thereof will be open and vice versa. It will be understood that it is not absolutely essential that these sets of shutters be correlated or interconnected mechanically or otherwise so that they will operate together, but as will be later apparent from the description of the operation of the method of this invention, it is essential that the shutters be so arranged with respect to each other that when the shutter at one end of one compartment is open, the shutter at the opposite end of the other compartment will be open, and that at the same time the other two sets of shutters will be closed. This can, of course, be accomplished by independent operation of each of the sets of shutters if the shutters are not mechanically or otherwise connected for operation together. However, it is preferable that the shutters be operated mechanically by regulators 19 dependent upon the temperature of the material treated adjacent the perforate inlet wall of the drying chamber.

Communicating with the shuttered openings at one end of each of the outside compartments just referred to is a conduit 27 leading from a blower or compressor 28 which in this instance has a rotor 29 actuated by a suitable power means connected to a pulley 30. It is intended, of course that this blower shall force air or other suitable drying medium through the conduit 27 and through one or the other of the shutters 24 and 25 whichever is open, into one of the compartments on one side of the grain compartment. The shutter at the opposite end of the compartment into which the drying medium is thus forced being closed, the drying medium is forced to flow through the body of grain within the grain compartment and thence outwardly through the open shutter which in Fig. 1 is the shutter 22.

The drying medium which is preferably atmospheric air the humidity of which has been reduced to a suitable percentage by some approved method, is drawn in through the intake conduit 31 into the blower 28. In the present instance it enters this intake conduit from the atmosphere at the open end 32 thereof, and passes through the annular space 33 around the outside of the burner housing 34. This burner housing is supported from one side wall of the conduit 31 by means of a lateral support 35 which includes a passageway from the exterior of the conduit 31 into the interior of the burner housing. Extending inwardly through this support 35 are burners 36 supplied with gas or other similar fuel through a supply pipe 37. It will be seen that the burner housing 34 is closed at its upstream end so as to prevent the incoming air from blowing through the burner housing and directly against the flame from the burners 36. However, air for the purpose of combustion will enter the burner housing through the support 35 and the products of combustion will flow out through the downstream end of the burner housing and mingle with the air taken in through the inlet 32.

In the manner just described, the intake air being blown through the grain by means of the blower 28 will be heated to such a temperature that its relative humidity will be greatly reduced while its temperature will be such as to assist greatly in the evaporation of moisture and consequent drying of the product within the chamber between the walls 15 and 16. The relative humidity of the air or other drying medium being forced through the product to be dried might, of course, be reduced alternatively or additionally by some other means than by the application of heat as for example by a chemical or mechanical drier of any well known construction generally indicated at 38. Even when produced by the application of heat, this reduction might be even more effective if the heat be applied indirectly rather than directly as illustrated, and if the products of combustion be not mixed with the air going through the blower. However, it has been found in practice that the moisture content of the products of combustion is not so great as to be highly objectionable or as to substantially raise the relative humidity of the heated air, and that on the other hand the heat saved by mingling the products of combustion with the air going to the product to be dried is so substantial as to make this method more desirable in most instances.

As hereinbefore stated, it has been thought undesirable to heat the air to be employed in drying grain or the like and especially in drying rice, hotter than some predetermined maximum temperature which is permissible for the product being dried. In the case of rice this maximum temperature is approximately 110°. In accordance with this invention, however, the air employed is preferably heated to a temperature of 150° Fahrenheit or thereabouts and it has been found that air so heated will have a relative humidity of between 6 and 8% even when the relative humidity of the atmosphere entering at 32 is in the neighborhood of 80%, the temperature of such air being around 80 to 85° Fahrenheit. Thus, the air flowing to the grain through the conduit 27 will in the case of rice be at a temperature of approximately 150° and will have a relative humidity of between 6 and 8%. This relatively very dry hot air is forced through the body of grain within the central compartment inside the grain drying housing and at this point a most remarkable and unexpected result occurs.

The first effect of blowing air at such a temperature and relative humidity through the body of rice is to reduce the tempertaure of the rice from its normal temperature. The only apparent explanation of this is that the air being so dry and so hot it induces such a rapid evaporation of moisture from the rice that the evaporation serves to refrigerate the rice and actually reduce its temperature. By actual temperature measurement it has been found that 160° air blown through a 9 inch thick column of rice is reduced in temperture from 160° to 130° while the temperature of the rice is initially actually reduced from 90° to 70° at the point where the air enters the rice. Thus, even though relatively hot air is used, the rice is not heated above the dangerous temperature of 110 to 112° and is not injured.

It is essential in connection with this invention that the body of rice or other product to be dried be of such a thickness as compared with the dryness, velocity and temperature of the air that the air will not become completely saturated in passing through the column. These conditions are satisfied with the column 9 inches thick and the air at a temperature 160° Fahrenheit and a relative humidity of approximately 8%, the air being blown through the body of rice at the rate of 400 cu. ft. per minute per barrel of rice.

After the drying operation has been going on for a period of time, the rate of drying naturally becomes less and the rice or other product begins to warm up again on the side of the column at which the air is entering. When the rice at that point attains some predetermined temperature below the danger point, for example 105° Fahrenheit, the direction of flow of air through the column is reversed. This is accomplished in the device illustrated in the drawing by manipulation of the shutters 21, 22, 24 and 25. Thus, if the shutters 22 and 24 were initially open and the shutters 21, and 25 closed, the air would take the path indicated by the solid arrows. Then when it is desired to reverse the direction of flow through the body of rice, the shutters 22 and 24 would be closed and the shutters 21 and 25 opened. When the temperature at the point of entrance of the air into the column becomes 105° and the temperature at the point where the air leaves the column would be probably 80°, so that when the flow of air is reversed, the hot air would then come in contact with the cooler portion of the rice. The actual results have shown that the side previously at a temperature of 80° then begins to warm up toward the predetermined point of 105° while the point previously at 105° begins to cool off. As soon as the point of entry of the air again becomes 105° in the rice, the direction of flow of the air is again reversed, and so on until the rice or other product has been dried a sufficient amount.

When the drying operation is initiated upon a given quantity of material the intervals between reversals of the direction of flow of drying medium will be relatively long and will in some instances be as long as 30 minutes or even more. As the drying of the material proceeds the intervals will become shorter and near the end of the process will be reduced to 5 seconds and even less. For this reason, it is preferred that the operation of the shutters be automatic in response to the heat sensitive elements 20 for accurate manual control is difficult to obtain and absolute control is essential.

By use of the foregoing process it has been found that rice may be dried until its moisture content is 14 or 15% with one pass through the apparatus and without damage to the rice. All the expense and trouble of the period of storage previously thought necessary, and the extra handling incident thereto have been eliminated by this invention, and a method and means of accomplishing the objects sought by the invention have been provided.

As hereinbefore stated, the method of this invention is applicable to the drying of a wide variety of products, and it will accordingly be understood that reference in the claims to "grain" and "grain or the like" is not intended as a limitation upon the material upon which the invention may be used. On the contrary, it is intended by these terms merely to designate the material being dried, and they should be construed as covering all substances to which the invention is applicable.

This application is a division of our co-pending application for United States Letters Patent, Serial No. 523,034, filed February 19, 1944.

Having described our invention, we claim:

1. The method of drying grain which comprises forcing a draft of atmospheric air through a body of said grain supported between two opposed, spaced perforate walls, heating said air before it encounters said grain to reduce the relative humidity thereof, measuring the temperature of the grain within the walls adjacent the perforate walls and reversing the direction of flow of said air through the body of grain when the temperature of the grain lying adjacent the perforate wall through which the air enters into the grain approaches a predetermined maximum danger point to which the grain may be heated without injury for the purpose for which the grain is to be used.

2. The method of drying a body of rice supported between two opposed spaced perforate walls which comprises forcing a draft of atmospheric air through a body of said grain, heating said air to a temperature of the order of 150° F. before it encounters said grain to reduce the relative humidity of said air measuring the temperature of the rice adjacent the perforate walls and changing the direction of flow of said air through said rice when the temperature of the rice adjacent the entrance of the air thereto approaches 110° F.

3. A method of drying material comprising the steps of retaining the material to be dried within a chamber having two opposed perforate walls, passing a heated gas into the chamber through one perforate wall and out of the chamber through the other perforate wall, measuring the temperature of the grain within the chamber adjacent the perforate walls, and reversing the direction of flow of gas through the chamber when the temperature of the material adjacent the perforate wall through which the drying gas is entering the chamber closely approaches a predetermined maximum temperature to which the material may be heated without injury for the purpose for which the material is to be used.

4. The method of drying a body of rice supported between two opposed spaced perforate walls which comprises forcing a draft of atmospheric air through a body of said grain, heating said air to a temperature of the order of 150° F. before it encounters said grain to reduce the relative humidity of said air, measuring the temperature of the rice adjacent the perforate walls, and changing the direction of flow of said air through said rice when the temperature of the rice adjacent the entrance of the air thereto approaches 105° F.

5. A method of drying material comprising the steps of retaining the material to be dried within a chamber having two opposed perforate walls, passing a heated gas into the chamber through one perforate wall and out of the chamber through the other perforate wall, said gas just as it enters the chamber having a moisture content less than 25% and a temperature higher than the maximum permissible temperature to which the material treated may be heated without injury for the purpose for which the material is to be used, measuring the temperature of the grain within the chamber adjacent the perforate walls, and reversing the direction of flow of gas through the chamber when the temperature of the material adjacent the perforate wall through which the drying gas is entering the chamber approaches said maximum permissible temperature to which the material may be heated.

ROSS BASSINGER.
OLIVER AMOS WRIGHT.

REFERENCES CITED

The following references are of record in the file of this patent:

UNITED STATES PATENTS

| Number | Name | Date |
|---|---|---|
| 1,259,632 | King | Mar. 19, 1918 |
| 1,711,574 | Miller | May 7, 1929 |
| 2,078,515 | Sutherland | Apr. 27, 1937 |
| 2,205,814 | Forster, Jr. | June 25, 1940 |
| 2,270,815 | Vaughan | Jan. 20, 1942 |
| 2,304,897 | Drum et al. | Dec. 15, 1942 |
| 2,340,633 | Wigelsworth | Feb. 1, 1944 |